Nov. 21, 1967  T. E. BRANSCUM  3,354,246

METHOD AND APPARATUS FOR BLOW MOLDING

Filed Nov. 20, 1963

INVENTOR.
T. E. BRANSCUM
BY
ATTORNEYS

United States Patent Office 3,354,246
Patented Nov. 21, 1967

3,354,246
METHOD AND APPARATUS FOR BLOW MOLDING
Tony E. Branscum, Bartlesville, Okla., assignor to Phillips Petroleum Company, a corporation of Delaware
Filed Nov. 20, 1963, Ser. No. 325,023
5 Claims. (Cl. 264—98)

This invention relates to molding. In one aspect this invention relates to improved apparatus for shaping and forming moldable materials. In another aspect this invention relates to an improved method for shaping and forming moldable materials into various items and articles.

In recent years plastic materials, especially polymers of 1-olefins termed "thermoplastics," have been widely accepted in the fabrication of many articles and items. The properties of plastic materials lend them utility in fabrication of numerous and various articles, such as films, toys, filaments, and the like; and particularly in the fabrication of containers, especially those having relatively large volumes compared to small openings, such as bottles, jugs, carboys, drums and the like. Plastic material are well suited to the container industry because of their general properties of rigidity, strength and inertness to many materials. Plastic materials can be fabricated by many methods. Particularly when fabricating hollow articles in a one-step operation, vacuum forming and blow molding offer the better advantages. In these operations the plastic material is placed in a mold and either a vacuum is drawn on the outside of the plastic material to shape it to the mold or positive air is introduced within the plastic material to force it to the shape of the mold. Due to the demand for hollow plastic articles, much development has been made in the art of blow molding. There have been many advances made in cooling of molds utilizing coils, water spray and refrigerant circulation within the mold. Also, advances in the methods of introducing air to the plastic material in the cavity of the mold by blow tubes, pins and needles have been developed. However, due to the ever-increasing demand for molding new articles having complex shapes with handles and increased size, more development has been required in the blow molding field.

In the art of blow molding, generally a two-section mold is employed having half of an article cavity in the parting face of each section. The sections are aligned so that when they are clamped together the contours of the cavity halves mate to form a cavity of the shape of the article to be molded. About the contour of the cavity in each section of the mold is provided a pinch-off device or compression edge which insures the plastic material is closed airtight for the blowing operation. The pinch-off device or compression edge comprises a lip extending from the mold section in alignment with the surface of the cavity; and generally a relief cavity is provided, being about the thickness of the parison, in each mold section face beyond the pinch-off device. With the mold sections apart, a parison of plastic material is placed therebetween and the mold sections are then clamped shut around the parison, pinching the parison together around the cavity and allowing the excess plastic material to flow into the relief cavity. Throughout this disclosure and the claims, the term "parison" is intended to include tubes, sheets, bubbles, and the like of plastic material positioned between the mold sections.

The above-described pinch-off device provides especially clean trim removal around irregular shapes that are blow molded. The pinch-off means can be on each section of the mold or on only one half of the mold, and the relief cavity can be along a portion of or completely along the the pinch-off means. Generally the relief cavity provided will be in extent the same that the pinch-off is provided in the mold. Obviously, when the parison wall is relatively thin, little relief area is required, and likewise when the parison wall is thick, greater relief area is required. When molding complex shapes, such as handles on containers and relatively large containers and vessels, such as gasoline tanks, the pinch-off device and relief area are important to the product quality. Very frequently the wall of the container adjacent to the cutout for the handle may show excessive thinning along the mold parting line. Also, when molding relatively large articles having irregular shapes, thinning is excessive at the parting lines of the mold.

Therefore, it is an object of this invention to provide an improved mold for molding hollow articles. It is another object of this invention to provide an improved method for molding hollow articles. Still another object of this invention is to provide apparatus and method for molding hollow articles without the normal thinning at parting lines.

Other objects, advantages and features of the invention will be readily apparent to those skilled in the art from the following description, the drawings, and the appended claims.

In accordance with my invention an improved mold for forming hollow objects is provided by providing a restriction in the relief cavity between the sections of the mold. In accordance with another embodiment of my invention, an improved process for forming hollow objects is provided by restricting the flow of molten polymer from the cavity of a mold to the relief cavity during the blowing and cooling operations.

All plastic materials which lend themselves to extrusion from a melt are applicable to this invention. Such materials include the polymers of mono-1-olefins. These polymers may be homopolymers such as polyethylene and polypropylene, copolymers such as ethylene-butene-1 copolymers, and blends of such polymers. In addition, materials such as polyvinyl chloride and polystyrene are applicable, as well as numerous other melt extrudable polymers and resins.

My invention will now be more fully described by reference to the accompanying drawings wherein.

Figure 1:
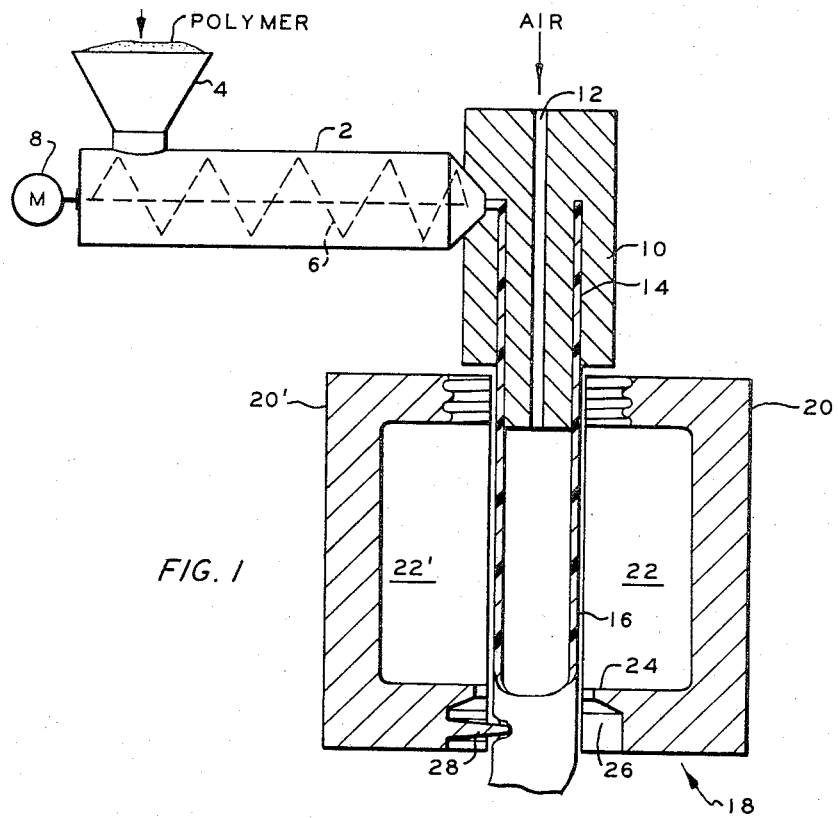
FIGURE 1 is a cross-sectional schematic view of apparatus in accordance with my invention showing the molding of a container. At the stage of the operation shown the mold halves are open and the parison is positioned therebetween.

Referring now to FIGURE 1, granular plastic material is introduced to extruder 2 through hopper 4. Heat is added to extruder 2 by means not shown to make the plastic material molten along with mechanical force applied by screw 6 positioned and aligned within extruder 2 and driven by motor 8 for forcing the resultant molten mass into die 10. Die 10 has central opening 12 for introduction of positive fluid pressure into the mold. Die 10 has annular area 14 for forming and extruding parison 16. Parison 16 is extruded between halves 20 and 20' of open mold 18. The mold halves have cavity portions 22 and 22' in the parting faces. About the contour of cavity sections 22 and 22', pinch-off device 24 is provided. In each mold half beyond pinch-off device 24 from cavity 22 is provided relief cavity 26. Within relief cavity 26 of mold half 20' restriction or dam means 28 is provided.

Figure 2:
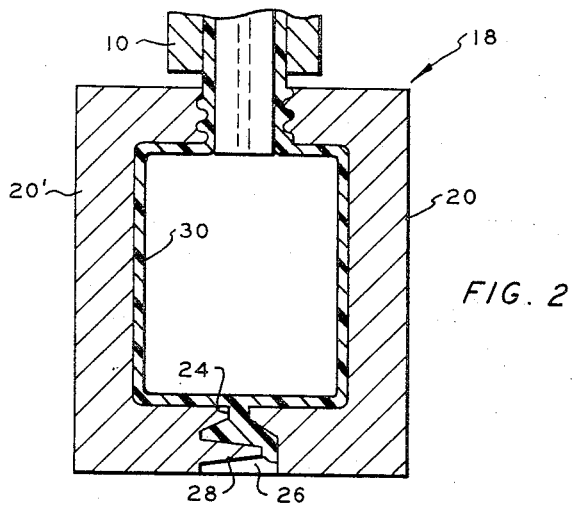
FIGURE 2 shows another step of molding operation with the molds closed and the container formed.

In FIGURE 2, mold halves 20 and 20' are in clamped position with parison 16 having been formed into container 30 of the shape of cavity sections 22 and 22'. The excess plastic material of parison 16 has flowed into relief cavity 26.

EXAMPLE

Pellets of polyethylene having a density of 0.960 gm./cc. as measured by ASTM D–1505–57T and a melt index of 0.2 as measured by ASTM D–1238–57T are introduced through hopper 4 into extruder 2 wherein they are made molten by screw 6 and heating means, not shown. The polyethylene is increased in temperature to about 400° F. in extruder 2. The molten polyethylene is forced through annular area 14 of die 10 to extrude parison 16 between open mold halves 20 and 20'. After the parison is extruded, the mold halves are closed by means not shown, such as air cylinders about the parison. Upon closing of the mold halves, air is introduced through conduit 12 which expands parison 16 to the shape of the mold cavity. The shaped parison is allowed to cool while confined in the closed mold. After sufficient cooling time the mold halves are opened and the molded container is removed.

When molding containers in the manner specified above, and employing the mold provided in accordance with this invention with restriction means 28 in relief area 26, the walls of the formed container at the parting line of the mold are the same thickness as the remainder of the walls of the container. No thinning at this area was apparent. In another test, using the above-described method of molding and employing a mold as shown in FIGURE 1 without restriction means 28 in relief cavity 26, the container formed was quite thin at the parting line of the mold as compared to the remainder of the container and was a weak point in the container.

The above description and reference to the drawing and operation thereof with the specific example of this invention are for description only and are not intended in any way to be a limiting factor thereto. From this example it is readily apparent that I have provided apparatus and method for improving the molding of plastic materials into hollow items and irregular shapes which produce improved articles of improved uniform wall thickness resulting in elimination of weak areas due to thinning. Particularly it is advantageous when molding large items from thick parisons because the restriction means in the relief cavity of the mold prevents extrusion of plastic material therethrough which cannot be cooled rapidly enough due to its thickness to prevent such extrusion.

To one skilled in the art it will be evident that many variations and modifications of this invention can be practiced in view of the foregoing disclosure that will come within the spirit and scope of the invention.

I claim:

1. In apparatus for blow molding which comprises at least a two-section mold means adapted to receive a parison; at least one mold section being provided in its parting face with an article cavity and at least one mold section being provided in its parting face with a relief cavity, said article cavity and relief cavity separated by compressing edges along the contours of said article cavity; the improvement which comprises a fixed restriction means in at least a portion of said relief cavity, said restriction means being so shaped as to allow displaced portions of the parison to flow into said relief cavity but by such flow to cause sufficient back pressure to build up substantially uniformly along said compressing edges that extrusion of other plastic material through said compressing edges is substantially prevented.

2. In apparatus for blow molding plastic materials comprising means for plasticating and forming a parison of plastic material; mold means having at least two-mated sections; each section being provided in its parting face with an article cavity portion, compressing edges along the contours of said article cavity portions and a relief cavity adjacent at least a portion of said compressing edges; means for parting and closing said mold sections about said parison; and means to admit a positive pressure medium to said parison; the improvement which comprises a fixed restriction means in at least a portion of said relief cavity, said restriction means being so shaped as to allow displaced portions of the parison to flow into said relief cavity but by such flow to cause sufficient back pressure to build up substantially uniformly along said compressing edges that extrusion of other plastic material through said compressing edges is substantially prevented.

3. In the molding of plastic materials which comprises extruding a parison of molten plastic material, clamping at least a two-section mold about said parison, pinching off the parison around the contours of a cavity in said mold, thereby displacing a portion of the parison from the remainder of the parison in said cavity, and introducing positive air to the interior of said parison to force it to take the shape of said cavity; the improvement which comprises uniformly restricting the flow of plastic material displaced by the pinching off step such that sufficient back pressure builds up in said displaced plastic material to substantially prevent the flow of additional plastic material from the cavity of said mold through the parting lines of said mold.

4. In the molding of plastic materials which comprises extruding a parison of molten plastic material, clamping at least a two-section mold about said parison, pinching off the parison around the contours of a cavity in said mold, thereby displacing a portion of the parison from the remainder of the parison in said cavity, causing said parison to take the shape of said cavity; the improvement which comprises uniformly restricting the flow of plastic material displaced by the pinching off step such that sufficient back pressure builds up in said displaced plastic material to substantially prevent the flow of additional plastic material from the cavity of said mold through the parting lines of said mold.

5. An apparatus according to claim 2 wherein said restriction comprises a fixed projection in at least one of said sections, said projection extending into said relief cavity at a spaced distance from said compressing edges.

References Cited

UNITED STATES PATENTS 3,174,181 3/1965 Langecker.
3,209,400 10/1965 Di Settembrini.

ROY B. MOFFITT, *Primary Examiner.*

ROBERT F. WHITE, *Examiner.*

A. R. NOE, *Assistant Examiner.*